F. W. CAMP.
DRIVING BELT OR CHAIN.
APPLICATION FILED DEC. 14, 1912.
1,254,389.
Patented Jan. 22, 1918.
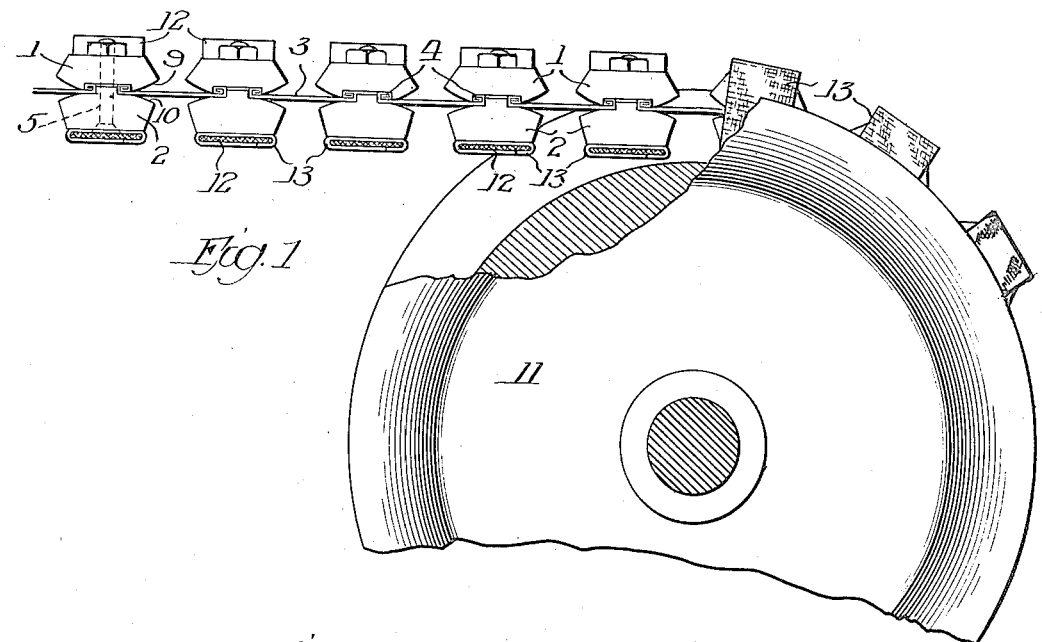
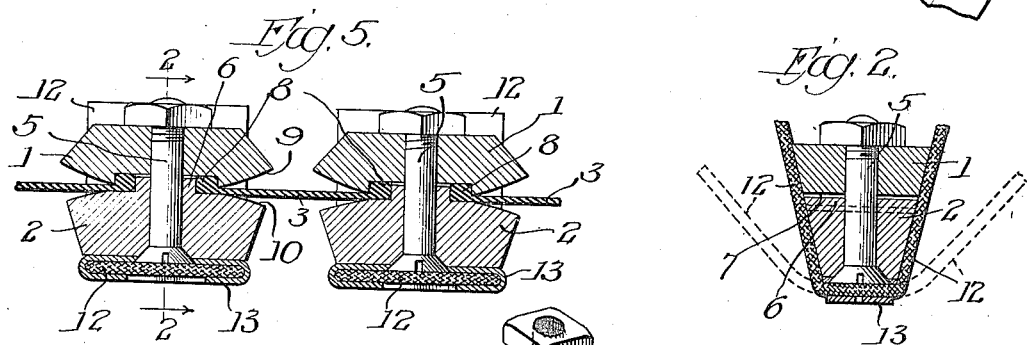
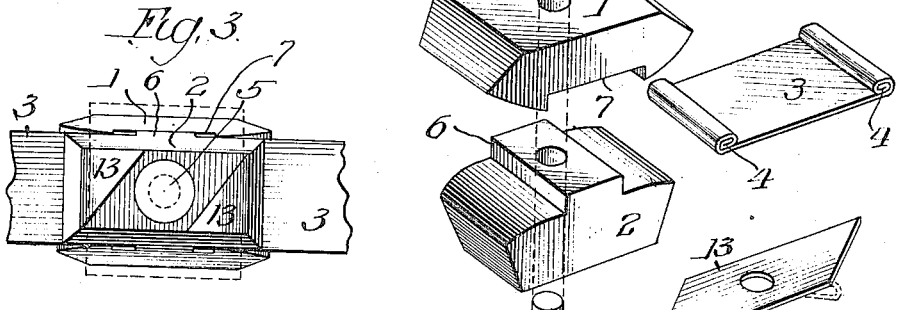
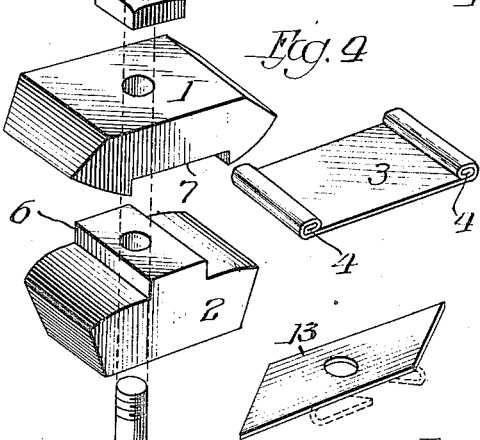
Witnesses:
Inventor:
Forrest W. Camp.
by Barton Folk
Attys.

UNITED STATES PATENT OFFICE.

FORREST WM. CAMP, OF GLENELLYN, ILLINOIS.

DRIVING BELT OR CHAIN.

1,254,389.  Specification of Letters Patent.  Patented Jan. 22, 1918.

Application filed December 14, 1912. Serial No. 736,712.

*To all whom it may concern:*

Be it known that I, FORREST WM. CAMP, a citizen of the United States, residing at Glenellyn, in the county of Dupage and State of Illinois, have invented a certain new and useful Improvement in Driving Belts or Chains, of which the following is a full, clear, concise, and exact description.

My invention relates to power transmission mechanism. The objects of my invention are to provide a driving belt or chain of increased efficiency, strength and mechanical simplicity, which shall have the required flexibility, which shall have sufficient weight to give the desired traction on small sheaves, even when the latter are arranged close together, and which shall permit of ready renewal of the parts subjected to the most wear.

In the accompanying drawings I have illustrated one embodiment of the invention which I have worked out in practice and which has important advantages from many viewpoints. It is to be understood, however, that the invention is susceptible of being embodied in various other forms.

Referring to the drawings,

Figure 1 is a side elevation of the preferred form of driving belt or chain, the same being shown in connection with a sheave or pulley;

Fig. 2 is a central, transverse, sectional elevation through one of the blocks or units of which the belt is composed;

Fig. 3 is a bottom, plan view of one of said units;

Fig. 4 is a perspective view showing the method of assembling a unit; and

Fig. 5 is a central, longitudinal, sectional elevation of two adjacent blocks connected by a modified form of link.

The driving belt is made up of a series of wedge-shaped bodies or units, each of which consists of a pair of small interfitting members 1, 2 which may be constructed in any convenient manner and which may assume various forms. For example, they may be made of solid blocks of iron or other suitable material, although I do not intend to limit myself by any means to a solid construction. Said units are connected by short links 3 of resilient metal, preferably spring steel or suitable equivalent material. The links may have their opposite ends connected to said units in various ways. One method is to enlarge said ends by rolling up the metal to form a shoulder which, after being flattened down somewhat, fits within a recess between the blocks 1, 2 and is clamped therein as shown, the blocks being firmly held together by bolts or rivets 5, the latter being the preferred construction.

The blocks have portions fitting one within the other, the projection 6 on one block being shorter than the corresponding recess 7 in the other block, whereby, when said blocks are clamped together, a suitable clearance is provided at opposite sides of said projection 6, constituting a pair of openings within which the enlarged ends 4 of the links 3 are received. The interfitting portions have the further function of locking the two blocks against relative rotation, should the securing bolt become somewhat loosened, where a bolt is used. Said links may also be constructed with integral shoulders 8 as shown in Fig. 5, said integral shoulders being formed by milling away the metal to reduce the thickness of the link to the desired point, leaving the end enlargements. They may also be constructed in various other ways.

When the parts are assembled in the proper manner the belt tends to straighten itself out, due to the fact that each link is firmly clamped at opposite ends in rigid relation to the wedge blocks. Said belt is flexed or bent by bending the individual steel links 3. In order that said links may bend gradually the adjacent faces 9 and 10 of the blocks 1 and 2 respectively are curved or rounded, whereby a flaring opening is provided. These rounded portions have a radius which is preferably slightly less than the effective radius of the smallest sheave with which the belt may be used. If the diameter of the sheave is known in advance the radius of said rounded portions is preferably slightly less than the radius of said sheave, whereby the spring steel link will flex around said curved surface, thereby insuring a smooth, continuous bend free from sharp angles. The radius of said rounded portion is also selected with reference to the degree of bending to which said links may be safely subjected repeatedly without exceeding the elastic limit of the metal. As shown in Fig. 1, the belt always bends in the same direction when passing over the driving or the driven sheave or pulley and accordingly the rounded shoulders 10 on the inner blocks are very essential. A belt of this character is usually made long enough to have some slack, whereby it generally sags considerably in its upper span, causing the links to bend in the opposite direction, whereby the provision of the rounded shoulders 9 on the outer blocks is also essential. These rounded shoulders have the effect of preventing breakage and prolong the life of the belt to a very marked degree.

It will be seen that each link is clamped between the adjacent blocks its full effective width, thereby rendering available the full tensile strength of the metal for any given section thereof. Furthermore, the enlargement 4 is clamped firmly so that there is no pivoting or turning thereof within the inclosing recess and accordingly there is no wear whatever due to friction.

The combined blocks 1 and 2 have tapering sides thereby forming a wedge-shaped block or element, as shown in Fig. 2. The converging walls of the block are adapted to fit within the correspondingly shaped converging walls of the sheave or pulley 11 and exert a wedging effect therein. In order to increase the frictional engagement and hence the traction I provide for each element a strip of fabric 12 which is preferably made of canvas, although various other materials are suitable for this purpose. Said fabric is pressed up against the converging walls of the block when the latter is wedged in the sheave, as shown in Fig. 2. At other times the fabric remains bent up against said walls, although, when first applied, it spreads out to about the position shown in dotted lines in said figure. The fabric is held to the narrow end of the wedge by a strip of metal 13 which is preferably secured to the block 2 by the same bolt or rivet which secures said block to its mate. The opposite ends of the metal strip are bent over to grip the fabric strip approximately at the middle thereof. The metal employed for this purpose is preferably mild steel, although other metals are suitable. Said strip may be very readily replaced, when it becomes worn, by simply bending outwardly the extremities of the metal clip 12, removing said strip of fabric, inserting a new one and bending said extremities back into place.

The tensile strength of a driving belt made in the manner described, is very high. Such a belt is also sufficiently flexible to enable it to conform readily to the curve corresponding to the effective diameter of the sheave even when the latter is of small diameter, and the weight of the individual units aids in securing the desired friction or traction with the sheaves.

It is to be understood, of course, that the embodiments of the invention described above are merely illustrative of the main features of the invention, and various other embodiments may be devised which fall within the scope of the invention. Accordingly I do not desire to limit myself to the details described and illustrated but desire to cover, in the appended claims, any suitable equivalent means for obtaining the desired ends wherever such means fall within the scope of said claims.

What I claim is:—

1. A driving belt, comprising a series of friction elements having flaring openings on opposite sides thereof, and short spans of metal ribbon connecting said elements and received within said openings, whereby the walls of said openings insure the bending of said metal to a curve of the proper radius when said belt is flexed.

2. In a driving belt, a series of wedge-shaped members flexibly connected together and each comprising a plurality of detachable parts, a securing element, a strip of fabric arranged with its middle portion at the narrow end of each wedge-shaped member, whereby a fabric covering is provided for each wedging face thereof to provide a friction surface therefor, and means for securing said middle portion to said end, said means permitting said fabric to be removed from said member without detaching the parts of the latter.

3. In a driving belt, a resilient metal link having an enlargement at each end, in combination with wedge-shaped elements having recesses on opposite sides within certain of which said enlargements are clamped.

4. In a device of the class described, a link for a driving belt consisting of a piece of spring steel ribbon having opposite ends folded over to form enlarged extremities of the full effective width of said ribbon.

5. In a driving belt, a two-piece wedging element, one piece having a projection fitting loosely within a recess in said other piece, whereby a clearance is provided on each side of said projection.

6. A driving belt comprising friction elements and individual links of flexible metal connecting said elements, said elements having curved portions constituting forms over which said links may be bent to the desired radius when said belt is being flexed.

In witness whereof, I hereunto subscribe my name this 12th day of December, A. D., 1912.

FORREST WM. CAMP.

Witnesses:
ALFRED H. MOORE,
McCLELLAN YOUNG.